United States Patent
Andrews

(10) Patent No.: US 7,209,937 B2
(45) Date of Patent: Apr. 24, 2007

(54) METHOD AND APPARATUS FOR GENERATION OF ARBITRARY MONO-CYCLE WAVEFORMS

(75) Inventor: Guillermo V. Andrews, Plano, TX (US)

(73) Assignee: Raytheon Company, Waltham, MA (US)

( * ) Notice: Subject to any disclaimer, the term of this patent is extended or adjusted under 35 U.S.C. 154(b) by 735 days.

(21) Appl. No.: 10/616,672

(22) Filed: Jul. 10, 2003

(65) Prior Publication Data

US 2005/0010625 A1 Jan. 13, 2005

(51) Int. Cl.
G06F 1/02 (2006.01)
(52) U.S. Cl. ...................................... 708/271
(58) Field of Classification Search ................. 708/271
See application file for complete search history.

(56) References Cited

U.S. PATENT DOCUMENTS

| | | | |
|---|---|---|---|
| 4,222,108 A | | 9/1980 | Braaten |
| 4,635,279 A | * | 1/1987 | Nossen ......................... 375/322 |
| 4,667,302 A | | 5/1987 | Mackey et al. |
| 5,258,937 A | * | 11/1993 | Blackmon .................... 708/272 |
| 5,430,764 A | * | 7/1995 | Chren, Jr. .................... 375/308 |
| 5,463,334 A | | 10/1995 | Griffin et al. |
| 5,467,294 A | | 11/1995 | Hu et al. |
| 5,502,499 A | * | 3/1996 | Birch et al. .................. 348/523 |
| 5,892,692 A | * | 4/1999 | Whikehart et al. ......... 708/272 |
| 6,091,269 A | * | 7/2000 | Rossum ....................... 327/107 |
| 6,333,649 B1 | | 12/2001 | Dick et al. ................... 327/105 |
| 2003/0062929 A1 | | 4/2003 | Langlois et al. ............. 327/100 |

FOREIGN PATENT DOCUMENTS

EP 1 037 379 A2 2/2000

OTHER PUBLICATIONS

PCT Search Report for PCT/US2004/022004, 13 pages.

* cited by examiner

*Primary Examiner*—D. H. Malzahn
(74) *Attorney, Agent, or Firm*—Baker Botts L.L.P.

(57) ABSTRACT

A waveform generator digitally synthesizes a waveform having a plurality of successive portions that can each be as short as one mono-cycle of the waveform, or a part of one mono-cycle. The waveform generator changes at least one of a frequency, a phase and an amplitude of the waveform between each successive pair of the portions thereof. A method includes digitally synthesizing a waveform having a plurality of successive portions that can each be as short as one mono-cycle of the waveform, or a part of one mono-cycle, including changing at least one of a frequency, a phase and an amplitude of the waveform between each successive pair of the portions thereof.

12 Claims, 1 Drawing Sheet

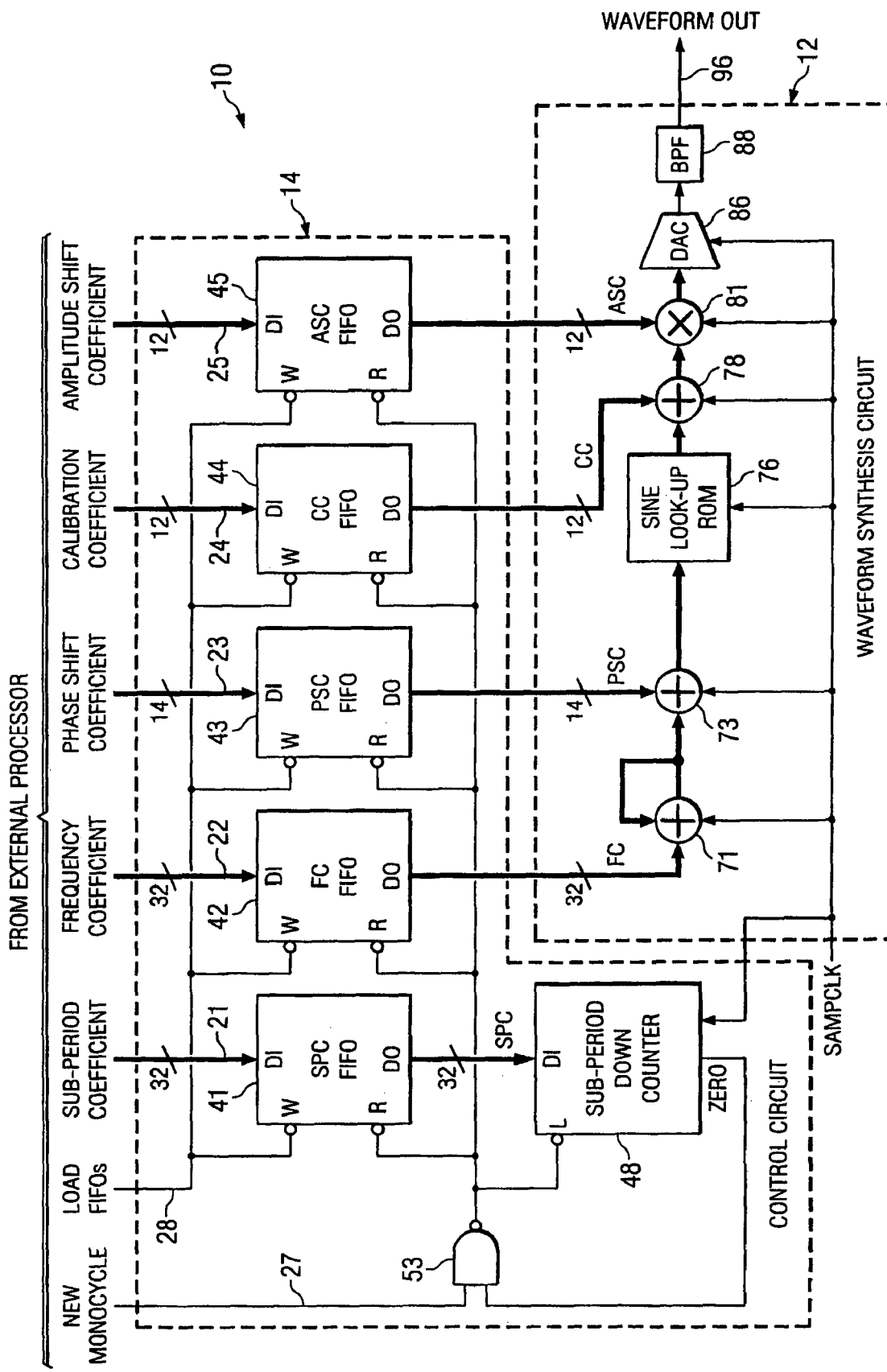

METHOD AND APPARATUS FOR GENERATION OF ARBITRARY MONO-CYCLE WAVEFORMS

TECHNICAL FIELD OF THE INVENTION

This invention relates in general to waveform generation and, more particularly, to a method and apparatus for generating a waveform in which characteristics such as frequency, phase and/or amplitude can vary from mono-cycle to mono-cycle.

BACKGROUND OF THE INVENTION

Over the years, a variety of types of waveform generators have been developed. One type of waveform generator is configured to generate a waveform in which the frequency, phase and/or amplitude changes from mono-cycle to mono-cycle, or even within a single mono-cycle. Existing waveform generators of this type have been implemented using analog circuitry, where phase and/or amplitude changes are often made using microwave phase shifters and attenuators, and frequency changes are often made using a signal generator having a degree of capability for frequency variation. While analog circuits of this type have been generally adequate for their intended purposes, they have not been satisfactory in all respects.

In this regard, an analog waveform generator of this type is relatively complex and expensive, and is usually hard-wired to produce a particular waveform. Consequently, the typical analog generator has little or no flexibility to permit variation of the waveform that it generates. When an analog waveform generator of this type is constructed in mass quantities, there will tend to be operational variations from unit to unit, due to analog considerations such as mismatch and drift of radio-frequency (RF) components within the analog circuitry. In addition, even for a single unit, accurate and dependable operation is difficult to obtain across all desired operating conditions, including temperature variations, due to factors such as the mismatch and drift of the RF components.

SUMMARY OF THE INVENTION

From the foregoing, it may be appreciated that a need has arisen for a better method and apparatus for effecting generation of a waveform in which frequency, phase and/or amplitude can be varied in each of a number of successive portions of the waveform. According to one form of the invention, an apparatus includes a waveform generator which digitally synthesizes a waveform having a plurality of successive portions that can each be as short as one mono-cycle of the waveform, or a part of one mono-cycle, the waveform generator changing at least one of a frequency, a phase and an amplitude of the waveform between each successive pair of the portions thereof.

A different form of the invention involves a method which includes digitally synthesizing a waveform having a plurality of successive portions that can each be as short as one mono-cycle of the waveform, or a part of one mono-cycle, including changing at least one of a frequency, a phase and an amplitude of the waveform between each successive pair of the portions thereof.

BRIEF DESCRIPTION OF THE DRAWINGS

A better understanding of the present invention will be realized from the detailed description which follows, taken in conjunction with the accompanying drawing, which is a block diagram of a waveform generator that embodies aspects of the present invention.

DETAILED DESCRIPTION OF THE INVENTION

The drawing is a block diagram of an apparatus which is a waveform generator circuit 10 that embodies aspects of the present invention. The circuit 10 includes a portion which is a waveform synthesis circuit 12, and a further portion which is a control circuit 14. The term "mono-cycle" is used herein to refer to a portion of the waveform which is effectively one period. As explained in more detail later, the waveform generator circuit 10 digitally synthesizes a waveform in which each mono-cycle can be independently defined in regard to at least one of its frequency, phase and/or amplitude.

The waveform generator circuit 10 receives control information from a not-illustrated external processor, on five groups of data lines 21–25 and on two control lines 27 and 28. The data received at 21 is a 32-bit sub-period coefficient (SPC), the data received at 22 is a 32-bit frequency coefficient (FC), the data received at 23 is a 14-bit phase shift coefficient (PSC), the data received at 24 is a 12-bit calibration coefficient (CC), and the data received at 25 is a 12-bit amplitude shift coefficient (ASC). Although the specific bit widths used in the disclosed embodiment for these coefficients is mentioned here, it will be recognized that a variety of other bit widths could alternatively be used for these bit widths.

The NEW MONO-CYCLE control signal received on line 27 instructs the waveform generator circuit 10 that, when it finishes generating the current mono-cycle of the waveform, it should generate the next mono-cycle based on one or more new parameters, in a manner discussed in more detail later. The LOAD FIFOs control signal received on line 28 is a load signal, which instructs the control circuit 14 to accept data from each of the groups of data lines 21–25, as discussed in more detail below.

The control circuit 14 includes five first-in-first-out (FIFO) memories 41–45, which can each store 1024 words. Although the FIFO memories 41–45 in the disclosed embodiment can each store up to a maximum of 1024 words, it will be recognized that each FIFO memory could alternatively have a maximum capacity which is a different number of words. The FIFO memories 41–45 each have a data input (DI) port which is coupled to a respective group of data lines 21–25. Further, the FIFO memories 41–45 each have a read control input (R), a write control input (W), and a data output (DO) port. The LOAD FIFOs control line 28 is coupled to the write control input of each of the FIFO memories 41–45.

The support circuitry of the external processor may include a not-illustrated 102-bit register which has five sections. In particular, the register would have a 32-bit section with outputs coupled to the data lines 21, a 32-bit section with outputs coupled to the data lines 22, a 14-bit section with outputs coupled to the data lines 23, a 12-bit section with outputs coupled to the data lines 24, and a 12-bit section with outputs coupled to the data lines 25. The external processor would load this register with a 102-bit word, if necessary by successively loading different portions of the register until all 102 bits have been loaded. Then, the external processor would generate a pulse on the LOAD FIFOs control line 28, in order to simultaneously load each of the FIFO memories 41–45 with one word corresponding to a respective section of the 102-bit register. By repeating this a number of times, the external processor can load each of the FIFO memories 41–45 with a stack or queue of words.

The control circuit 14 includes a 32-bit down counter 48, which has a data input (DI) port that is coupled to the data output (DO) port of the FIFO memory 41. The counter 48 has a clock input which receives a sample clock (SAMPCLK) signal. The SAMPCLK signal is synchronized to a clock signal of the external processor. The counter 48 has a load input L which, when enabled, causes the counter 48 to be loaded with the 32-bit word which is currently being output by the FIFO memory 41. The counter 48 has a zero output ZERO, which the counter 48 enables when it has counted down to a value of zero. A NAND gate 53 has a first input which is coupled to the NEW MONO-CYCLE control line 27 from the external processor, and a second input which is coupled to the ZERO output of the counter 48. Further, the gate 53 has an output which is coupled to the load input of the counter 48, and also to the read control input of each of the FIFO memories 41–45.

The waveform synthesis circuit 12 includes a digital frequency adder 71, which has a first input port, which has an output port coupled to its first input port, and which has a second input port coupled to the output of the FIFO memory 42. Since the output port of adder 71 is coupled to one of the inputs thereof, the adder 71 functions as a form of accumulator.

The circuit 12 also includes a digital phase adder 73, which has a first input port coupled to the output port of the adder 71, which has a second input port coupled to the output of the FIFO memory 43, and which has an output port. In addition, the circuit 12 includes a read-only memory (ROM) 76, which contains a sine look-up table. The memory has an input port which is coupled to the output port of the adder 73, and has an output port. Conceptually, the input port corresponds to the address lines of the memory 76, and the output port corresponds to the data output lines of the memory 76.

The circuit 12 also includes a digital calibration adder 78, which has a first input port coupled to the output port of the memory 76, which has a second input port coupled to the output of the FIFO memory 44, and which has an output port. Further, the circuit 12 includes an amplitude multiplier 81 which has a first input port coupled to the output port of the adder 78, which has a second input port coupled to the output of the FIFO memory 45, and which has an output port.

The circuit 12 includes a digital-to-analog converter (DAC) 86, which has an input port coupled to the output port of the multiplier 81, and which has an output. The circuit 12 includes a bandpass filter (BPF) 88, which has a input coupled to the output of the DAC 86, and which has an output 96 that carries an analog waveform, the analog signal serving as the output of the waveform generator circuit 10. The adder 71, adder 73, ROM 76, adder 78, multiplier 81, and DAC 86 each receive the clock signal SAMPCLK, and are each configured to change their outputs in a manner synchronized to this clock.

In the disclosed embodiment, arithmetic operations prior to the ROM 76 (in the accumulator 71 and the adder 73) involve only positive numbers, and are carried out using unsigned binary numbers. Arithmetic operations after the ROM 76 (in the adder 78 and the multiplier 81) involve both positive and negative numbers, and are carried out using numbers in a form commonly referred to as offset binary. In the offset binary format, numbers range from a value which is all binary zeroes ("000000000000") and represents the maximum negative number, to a number which is all binary ones ("111111111111") and represents the maximum positive number. Two successive numbers halfway through the range ("011111111111" and "100000000000") represent respective values just on either side of the zero crossing point.

This offset binary form is used in the disclosed embodiment because it is compatible with the input of the DAC 86. In particular, and as known in the art, when a value of all binary zeroes ("000000000000") is present at the input to the DAC 86, it causes the DAC to generate a negative full scale voltage or current. When a value of all binary ones ("111111111111") is present at the input to the DAC, it causes the DAC to generate a positive full scale voltage or current. In the disclosed embodiment, the ROM 76 is configured to accept unsigned binary numbers at its input, and the numbers stored in the ROM 76 are in offset binary form. Consequently, the ROM 76 serves to effect a conversion from numbers in unsigned binary form to numbers in offset binary form.

Although the disclosed embodiment uses numbers in unsigned binary form and offset binary form, it would alternatively be possible to use numbers which are represented in some other suitable forms. In addition, although the disclosed embodiment uses the ROM 76 to effect a conversion from unsigned binary form to offset binary form, the conversion could alternatively be effected in some other suitable manner.

The operation of the waveform generator circuit 10 will now be briefly described. As discussed above, the not-illustrated external processor loads its not-illustrated 102-bit register with 102 bits which are referred to herein as a parametric definition of a mono-cycle, and which represent five coefficients that respectively correspond to the five groups of data lines 21–25. The external processor then enables the LOAD FIFOs control line 28 in order to cause each of these five coefficients to be simultaneously loaded into a respective word of a respective FIFO memory 41–45. The external processor can cause the waveform generator 10 to generate only a single mono-cycle corresponding to a given parametric definition, or can cause the waveform generator 10 to generate two or more successive mono-cycles that all correspond to a given parametric definition. The external processor can load the FIFO memories 41–45 with as many as 1024 parametric definitions, which each include five coefficients.

Since frequency is one of the characteristics that can be independently selected for each mono-cycle, it will be recognized that the period of one mono-cycle of a given waveform may be longer or shorter than the period of an entirely different mono-cycle of that same waveform. It will therefore be recognized that the number of SAMPCLK pulses which occur during any given mono-cycle of a waveform may be different from the number of SAMPCLK pulses which occur during a different mono-cycle of that same waveform.

The sub-period coefficient received on lines 21 is related to the associated frequency coefficient received at 22, in that the sub-period coefficient represents the number of SAMPCLK clock pulses which will occur in a mono-cycle that has the frequency specified by the frequency coefficient. The five coefficients of a given parametric definition will all be present at the outputs of the FIFO memories 41–45 just prior to the start of the mono-cycle that they will define, and the sub-period coefficient FTC is loaded into the down counter 48 at the start of that mono-cycle. The down counter 48 will then count pulses of the SAMPCLK signal until the counter reaches zero and enables its ZERO output, thereby indicating that the end of the mono-cycle has been reached. When this occurs, one of two different things will happen.

First, if the NEW MONO-CYCLE control line 27 from the external processor is enabled, the gate 53 will actuate its output. This will in turn cause each of the FIFO memories 41–45 to shift a new word to its output port, representing a new parametric definition (five coefficients) which will be used to define the next mono-cycle. The output of gate 53 also causes the counter 48 to be loaded with the new sub-period coefficient SPC representing the length of the new mono-cycle.

On the other hand, if the NEW MONO-CYCLE control line 27 from the external processor is not enabled when the counter 48 enables its ZERO output, the output of the gate 53 will not be actuated. Consequently, the FIFO memories 41–45 will not change their outputs, and the counter 48 will not be loaded with a new coefficient, but instead will reuse the coefficient with which it was previously loaded, and will begin counting from the value of the SPC coefficient down to zero again. Consequently, the waveform generator circuit 10 will generate two successive mono-cycles that are effectively identical. In fact, so long as the external processor does not actuate the NEW MONO-CYCLE control line 27, the waveform generator 10 will continue using a single parametric definition of five parameters to generate a series of mono-cycles that are all the same. In contrast, if the external processor keeps the NEW MONO-CYCLE control line 27 continuously actuated, the waveform generator 28 will use a new parametric definition of five coefficients for each successive mono-cycle, and if each parametric definition is different, then each successive mono-cycle will be different.

As mentioned above, the frequency adder 71 has its data output port coupled to one of its data input ports, and thus effectively serves as an accumulator. In particular, in response to each pulse of the clock signal SAMPCLK, the frequency adder 71 takes the accumulation value and adds to it the frequency coefficient obtained from the data output port of the FIFO memory 42. In response to each clock pulse SAMPCLK, the phase adder 73 adds the current accumulation value from the output of the adder 71 to the phase shift coefficient obtained from the data output port of the FIFO memory 43.

The sine look-up ROM 76 effectively converts the output of the adder 73 into a corresponding sine value. Over time, the output of the ROM 76 will include both positive and negative values, and as mentioned above, the numbers output by the ROM 76 are in offset binary form.

In response to each SAMPCLK pulse, the calibration adder 78 adds the current sine value from the output of the ROM 76 with the calibration coefficient obtained from the data output port of the FIFO memory 44. In response to each SAMPCLK pulse, the amplitude multiplier 81 takes the value from the output adder 78 and multiples it by the amplitude shift coefficient obtained from the data output port of the FIFO memory 45.

In response to each SAMPCLK pulse, the DAC 86 converts the current digital output from the multiplier 81 into an analog voltage, which is supplied to the BPF 88. Persons skilled in the art will recognize that the analog output voltage from the DAC 86 will essentially be a series of successive step voltages which collectively approximate the waveform that is being generated. The BPF 88 serves to smooth out this waveform by removing high-frequency characteristics, thereby reducing or eliminating jagged edges which are an inherent byproduct of the digital-to-analog conversion. Further, the BPF 88 removes low-frequency characteristics, including any DC component that may happen to be present in the output of the DAC 86. The output signal produced at 96 by the BPF 88 is the output waveform from the waveform generator 10.

Thus, the adder 71, adder 73, ROM 76, adder 78 and multiplier 81 serve to digitally synthesize the desired waveform, where each mono-cycle of the waveform has a frequency, phase and amplitude that are respectively determined by the frequency coefficient FC from the FIFO memory 42, the phase shift coefficient PSC from the FIFO memory 43, and the amplitude shift coefficient ASC from the FIFO memory 45. The calibration coefficient CC from the FIFO memory 44 is not needed in order to synthesize the waveform, but instead is provided because it is advantageous for the purpose of calibrating out certain quantization errors caused by the sine look-up ROM 76, the amplitude multiplier 81, and the DAC 86. After the waveform has been digitally synthesized, the DAC 86 converts it into an analog waveform and the BPF 88 smoothes out this analog waveform, as discussed above.

The foregoing discussion reflects a mode of operation in which the sub-period coefficient 21 is always intentionally selected to correspond to one period of the frequency specified by the frequency coefficient 22. Consequently, as discussed above, each set of five coefficients serving as a respective parametric definition is utilized for one or more full mono-cycles. In an alternative mode of operation, it is possible for the external processor to provide a parametric definition in which the sub-period coefficient 21 is not selected to be the number which would correspond to one full period of the frequency specified by the frequency coefficient 22, but instead is selected to be a smaller number which represents less than one full period. Consequently, when this number is loaded into the counter 48, the counter 48 will reach zero and enable the gate 53 before the end of a full period at the specified frequency, or in other words before the end of the current mono-cycle. The next set of coefficients would thus be put into effect partway through the current mono-cycle, and the characteristics of the waveform generated at 96 would change partway through that mono-cycle.

The present invention provides a number of advantages. One such advantage is due to the fact that the waveform generator uses digital circuitry to generate each mono-cycle of a waveform, where each mono-cycle can be independently configured in terms of one or more of its frequency, phase and/or amplitude. This digital synthesis is carried out using a circuit which is relatively simple and inexpensive, and which permits a significant degree of flexibility in generation of successive mono-cycles of a waveform, without the complexity, expense and inflexibility present in traditional analog approaches. The digital synthesis avoids technical problems traditionally associated with generation of mono-cycle waveforms, including mismatch and drift in radio-frequency (RF) components of analog approaches. A related advantage is that digital synthesis yields a system which has higher fidelity and lower maintenance than traditional analog approaches.

Although one embodiment has been illustrated and described in detail, it will be understood that various substitutions and alternations can be made therein. For example, in applications where it is desirable for the waveform generator to produce two waveforms that are identical except they are offset in phase by 90°, additional circuitry can be added to the disclosed waveform synthesis circuit, including a cosine look-up ROM coupled to the output of the phase adder, a further calibration adder coupled to the output of the cosine look-up ROM and to the output of the calibration coefficient FIFO memory, a further amplitude multiplier coupled to the output of the further calibration adder and to the output of the amplitude shift coefficient FIFO memory, a further DAC coupled to the output of the further amplitude multiplier, and a further BPF coupled to the output of the further DAC. Other substitutions and alterations are also possible without departing from the spirit and scope of the present invention, as defined by the following claims.

What is claimed is:

1. An apparatus comprising a waveform generator which digitally synthesizes a waveform having a plurality of successive portions that can each be as short as one of a mono-cycle of said waveform and a part of a mono-cycle of said waveform, said waveform generator changing at least one of a frequency, a phase and an amplitude of said waveform between each successive pair of said portions thereof, wherein said waveform generator includes:
   a digital accumulator having a first input responsive to a frequency coefficient, having a second input, and having an output coupled to said second input;
   a digital adder having a first input responsive to a phase coefficient, having a second input coupled to said output of said accumulator, and having an output;
   a digital sine generator having an input coupled to said output of said adder, and having an output, said sine generator producing at said output thereof a value which is the sine of a value at said input thereof; and
   a digital multiplier having a first input responsive to an amplitude coefficient, having a second input coupled to said output of said sine generator, and having an output.

2. An apparatus comprising a waveform generator which digitally synthesizes a waveform having a plurality of successive portions that can each be as short as one of a mono-cycle of said waveform and a part of a mono-cycle of said waveform, said waveform generator changing at least one of a frequency, a phase and an amplitude of said waveform between each successive pair of said portions thereof, wherein said waveform generator includes:
   a digital accumulator having a first input responsive to a frequency coefficient, having a second input, and having an output coupled to said second input;
   a digital adder having a first input responsive to a phase coefficient, having a second input coupled to said output of said accumulator, and having an output;
   a digital sine generator having an input coupled to said output of said adder, and having an output, said sine generator producing at said output thereof a value which is the sine of a value at said input thereof; and
   a digital multiplier having a first input responsive to an amplitude coefficient, having a second input coupled to said output of said sine generator, and having an output;
   wherein said waveform generator changes at least one of said frequency coefficient, said phase coefficient and said amplitude coefficient at the end of each said portion of said waveform.

3. An apparatus according to claim 2, wherein said waveform generator further includes an analog section for converting said digitally synthesized waveform into an analog waveform.

4. An apparatus according to claim 2, wherein said waveform generator further includes:
   a digital-to-analog converter having an input coupled to said output of said multiplier and having an output; and
   a bandpass filter having an input coupled to said output of said digital-to-analog converter, and having an output.

5. An apparatus according to claim 2, wherein said waveform generator further includes a further digital adder having a first input responsive to a calibration coefficient, having a second input coupled to said output of said sine generator, and having an output, said second input of said multiplier being coupled to said output of said further digital adder.

6. An apparatus according to claim 5,
   wherein said waveform generator further includes a control section having a plurality of first-in-first-out memories which are operated in synchronism and which each have an output; and
   wherein said accumulator, said adders, and said multiplier each have said first input thereof coupled to the output of a respective said first-in-first-out memory.

7. An apparatus according to claim 6, further including:
   a counter having a load input, having a data input coupled to an output of one of said first-in-first-out memories, and having an output which is actuated in response to a predetermined count condition; and
   a gate having a first input responsive to a change enable signal, having a second input coupled to said output of said counter, and having an output which is coupled to said load input of said counter and to a read input of each of said first-in-first-out memories.

8. A method comprising: digitally synthesizing a waveform having a plurality of successive portions that can each be as short as one of a mono-cycle of said waveform and a part of a mono-cycle of said waveform, including changing at least one of a frequency, a phase and an amplitude of said waveform between each successive pair of said portions thereof, wherein said digitally synthesizing includes:
   periodically adding a frequency coefficient to an accumulation value;
   periodically adding a phase coefficient to a value which is a function of said accumulation value to thereby obtain a further value;
   periodically determining a sine value that corresponds to a value which is a function of said further value; and
   periodically multiplying an amplitude coefficient by a value which is a function of said sine value to thereby obtain an additional value.

9. A method comprising: digitally synthesizing a waveform having a plurality of successive portions that can each be as short as one of a mono-cycle of said waveform and a part of a mono-cycle of said waveform, including changing at least one of a frequency, a phase and an amplitude of said waveform between each successive pair of said portions thereof, wherein said digitally synthesizing includes:
   periodically adding a frequency coefficient to an accumulation value;
   periodically adding a phase coefficient to a value which is a function of said accumulation value to thereby obtain a further value;
   periodically determining a sine value that corresponds to a value which is a function of said further value;
   periodically multiplying an amplitude coefficient by a value which is a function of said sine value to thereby obtain an additional value; and changing at least one of said frequency coefficient, said phase coefficient and said amplitude coefficient at the end of each said portion of said waveform.

10. A method according to claim 9, further including:
converting successive said additional values into an analog waveform; and
bandpass filtering said analog waveform.

11. A method according to claim 9, further including periodically adding a calibration coefficient to a value which is a function of said sine value to thereby obtain a calibration value, said multiplying being carried out by multiplying said amplitude coefficient by a value which is a function of said calibration value.

12. A method according to claim 9, further including converting said digitally synthesized waveform into an analog waveform.

* * * * *